(12) United States Patent
McHale

(10) Patent No.: US 6,481,731 B2
(45) Date of Patent: Nov. 19, 2002

(54) REDUNDANT OUTER TIE ROD ASSEMBLY AND METHOD

(75) Inventor: Michael Joseph McHale, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 13 days.

(21) Appl. No.: 09/813,938

(22) Filed: Mar. 21, 2001

(65) Prior Publication Data

US 2002/0135149 A1 Sep. 26, 2002

(51) Int. Cl.$^7$ .................................................. G62D 7/06
(52) U.S. Cl. ............................ 280/93.511; 280/93.51; 280/93.503
(58) Field of Search ....................... 280/93.511, 93.512, 280/93.51, 93.502, 93.503, 93.509, 93.514, 107, FOR 125; 403/122, 56; 180/258, 259

(56) References Cited

U.S. PATENT DOCUMENTS 5,531,466 A * 7/1996 Hayashi ....................... 280/99
5,975,573 A * 11/1999 Belleau ................... 280/93.514

FOREIGN PATENT DOCUMENTS

| EP | 416981 | * | 3/1991 | ........ 280/FOR 107 |
| GB | 299451 | * | 3/1929 | ........ 280/FOR 107 |

* cited by examiner

Primary Examiner—Eric Culbreth
(74) Attorney, Agent, or Firm—Edmond P. Anderson

(57) ABSTRACT

The vehicle steering linkage connects a rack of a steering system to a knuckle. The steering linkage includes a tie rod, an inner ball joint and an outer connector assembly for transmitting steering forces between a rack and a knuckle. The outer connector assembly includes a primary connector and a secondary connector. The primary connector includes a socket in a socket member, a ball retained in the socket and a shank that is integral with the ball and secured to an arm of the knuckle. The secondary connector includes a slot in the socket member and a bolt. A bolt shank passes through the slot and screws into the arm. Upon failure of the primary connector, the secondary connector transmits steering forces to the arm.

17 Claims, 1 Drawing Sheet

REDUNDANT OUTER TIE ROD ASSEMBLY AND METHOD

TECHNICAL FIELD

The redundant outer tie rod assembly protects against failure of an outer tie rod connection to a steering knuckle in a rack and pinion steering system.

BACKGROUND OF THE INVENTION

The tie rod of a vehicle rack and pinion steering system has an inner tie rod connector assembly that is connected to a rack of the rack and pinion steering system and an outer tie rod connector assembly that is connected to a steering knuckle. The inner and outer tie rod connector assemblies must accommodate vertical movement of the steering knuckle about a virtual or actual fore and aft extending axis formed by the suspension system. Pivotal movement about an axis of the king pin and horizontal movement of the rack toward and away from the steering knuckle must also be accommodated by the inner and outer tie rod connector assemblies. These movements all decrease when the steering system is employed to steer the rear wheels of a vehicle with four wheel steering. However the decreased movements must be accommodated. Ball and socket connections between the steering rack and the inner end of the tie rod as well as between the steering knuckle and an outer end of the tie rod are the preferred connections.

Ball and socket connections, like all mechanical connections can fail. Failures, if they do occur, are most likely due to a long period of use, inadequate lubrication or a joint overload. These failures may be in a part that breaks, a tie rod housing crimp that retains a ball in a socket, in threads that attach one of the ball joint members to the steering knuckle, in the steering rack or in a tie rod shank. Looseness in ball and socket joints connected to the front steered wheels of a vehicle can be detected as excess free travel in the steering wheel. Such looseness is an indication that there could be a tie rod connector failure. Looseness in the ball and socket joints of the rear steered wheels of a vehicle with four wheel steering is generally not detectable as free play in the steering wheel.

The front steered wheels of a vehicle have a steering geometry that includes caster, camber and toe in. This geometry tends to move the front steered wheels to positions which direct the vehicle straight forward if the operator releases the steering wheel or if a ball joint fails. Rear steered wheels generally have a different geometry. Due to the different geometry rear steered wheels may not tend to return to a straight forward position if a ball joint in the steering linkage fails. Wear or damage to the ball joints in a rear wheel steering systems is more difficult to detect and a failure of one of these ball joints may make a vehicle unstable.

SUMMARY OF THE INVENTION

The vehicle steering linkage for steering a vehicle wheel includes a first link and a second link. A primary connection between the first link and the second link includes a ball fixed to one of the links and a socket that retains the ball and is fixed to the other one of the first and second links. A redundant connection between the first link and the second link includes a slot through the first link and a retainer that is attached to the second link, passes through the slot and has a large head which prevents separation of the of second link from the first link. Steering forces pass through the primary connection prior to failure of the primary connection. Steering forces pass through the redundant connection following failure of the primary connection.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
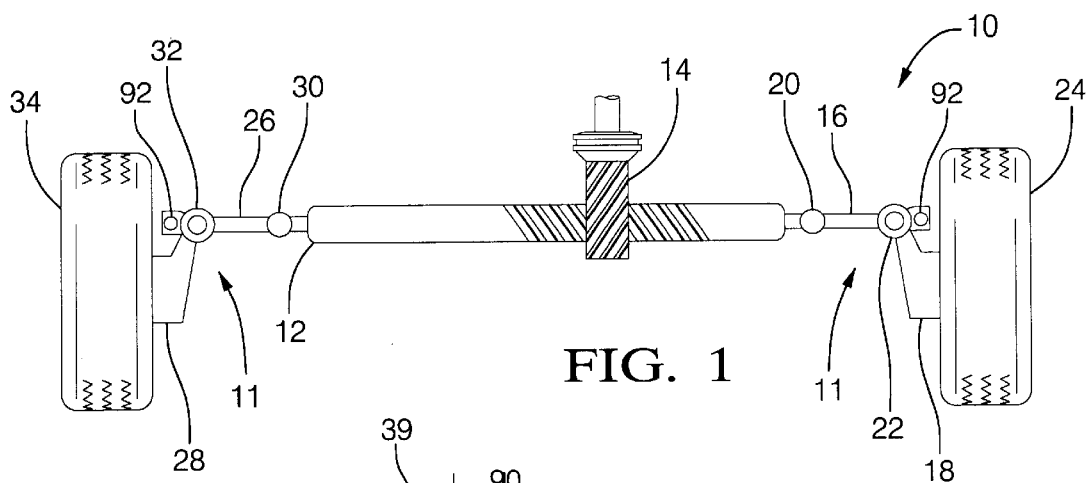
FIG. 1 is a digrammatic bottom view of a vehicle rack and pinion steering system.

A vehicle rack and pinion steering system 10, as shown in FIG. 1, has a rack 12 that is moveable back and forth by a rotatable pinion 14. The rack 12 is mounted in and guided by a rack and pinion housing (not shown) that is connected to a vehicle. If the steering system 10 is for the front wheels of a vehicle, the pinion 14 is connected to and rotated by a steering wheel. If the steering system 10 is for the rear wheels of a vehicle with four wheel steering, the pinion 14 is driven by an actuator (not shown). The actuator can be powered electrically, hydraulically, mechanically, or manually.

The vehicle steering linkage 11 includes a right tie rod 16 that is connected to the rack 12 and to a right steering knuckle 18 by an inner ball joint 20 and an outer connector assembly 22. A right tire and wheel 24 is journaled on the right steering knuckle 18. A left tie rod 26 is connected the rack 12 and to a left steering knuckle 28 by an inner ball joint 30 and an outer connector assembly 32. A left wheel and tire 34 are journaled on the left steering knuckle 28.

Figure 2:
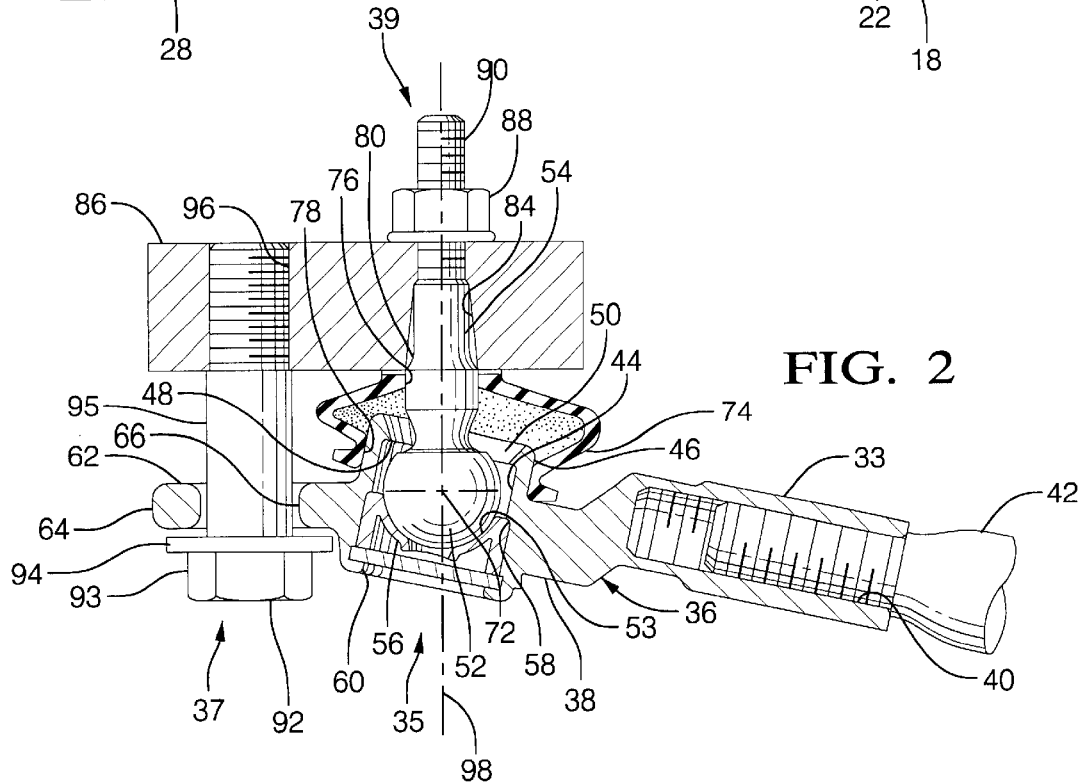
FIG. 2 is a sectional view of a ball joint connector, a redundant outer tie rod connector assembly and a portion of a steering knuckle.

The outer connector assemblies 22 and 32 both include a primary connector 35 and a secondary or redundant connector 37 shown in FIG. 2. The primary connector 35 is a ball joint assembly 36, as shown in FIG. 2, that includes a tie rod end bracket 33 with a socket member 38 and a threaded bore 40. A tie rod outboard end 42 screws into the threaded bore 40. A cylindrical ball bore 44 is formed in an enlarged cylindrical portion 46 of the socket member 38. The upper end of the ball bore 44 is partially closed by a flange 48 that extends radially inward to a shank passage 50. The shank passage 50 has a smaller diameter than the diameter of the ball bore 44.

A spherical ball 52 with an integral shank 54 is inserted into the ball bore 44 from the bottom with the shank 54 leading and passing through the shank passage 50. The flange 48 keeps the spherical ball 52 from passing through the shank passage 50. A ball retainer 56 is pressed into the bottom end of the bore 44 and up against a step 58 in the bore diameter. A flange on the bottom end of the ball bore 44 is rolled inward to form a retainer edge 60 that securely holds the retainer 56 in the ball bore. This essentially fixes the spherical ball 52 in the ball bore 44 while permitting limited pivotal movement of the shank 54 within the shank passage 50. The spherical ball 52 is also permitted to rotate in the socket 53 formed in the socket member 38 by the ball retainer 56 and the flange 48.

Figure 3:
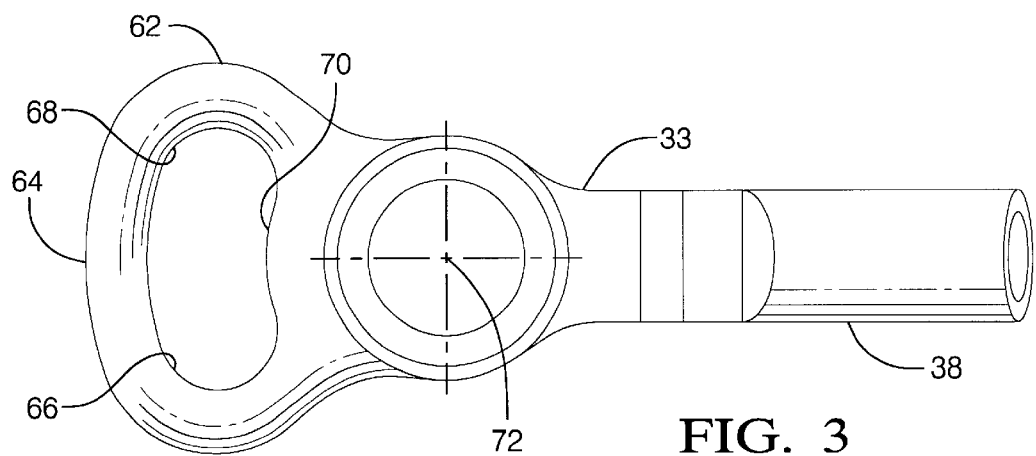
FIG. 3 is a bottom view of the outer tie rod end bracket.

A ring member 62 is integral with the outboard end 64 and forms a slot 66. The slot 66 has an outboard wall 68 and an inboard wall 70, shown in FIG. 3, that are arcs about the center 72 of the spherical ball 52.

A rubber boot 74 is slipped over the shank 54 and has an upper aperture 76 that seals against the shank and a lower aperture 78 that seals against the outside surface of the enlarged cylindrical portion 46. The purpose of the rubber boot 74 is to keep water and contaminates such as sand and dust away from the spherical ball 52 while holding lubricant in the ball bore 44 with the ball. The ball 52 can be packed in lubricant during manufacture or a fitting for a grease gun can be provided. Grease insures that the ball is free to pivot in the ball bore 44 and reduces wear in the spherical ball 52 and the socket member 38.

The shank 54 has conical surface 80 that mates with the conical bore 84 in an arm 86 of the steering knuckle 18 or 28. When the nut 88 is screwed onto a threaded end 90 of the shank 54, a wedging action between the conical surface 80 and bore 84 locks the ball 52 relative to the arm 86 to prevent wear on the shank 54 and in the bore 84.

The secondary or redundant connector 37 includes a bolt 92 and a slot 66. The bolt 92 with a bolt head 93 and an integral flange 94, has a bolt shank 95 that passes through the slot 66 and screws into a threaded bore 96 in the arm 86 of the steering knuckle 18 or 28. The slot 66 permits the socket member 38 to pivot freely about the center line 98 of the shank 54 through the full range of movement of the steering knuckle 18 or 28. The bolt head 93 and the flange 94 prevent separation of the tie rod 42 from the steering knuckle 18 or 28. Limited pivotal movement of the socket member 38 in other directions about the center 72 of the spherical ball 52 are permitted by the slot 66 and the shank 95 of the bolt 92. The steered rear wheels of a four wheel steering system generally have a relatively small steering angle and no suspension travel angle making it possible to reduce the size of the slot 66.

A failure of spherical ball 52, the shank 54, the shank threads 90, the ball retainer 56 or the flange 48 will drop the ring member 62 onto the flange 94. The bolt 92 and flange 94 will support the tie rod outboard end 42. Steering forces will be transmitted through the outboard wall 68 and the inboard wall 70 to the bolt 92 and to the arm 86 of the steering knuckle 18 or 28. The redundant connector 37 will still steer a wheel 24 or 34. However, the metal to metal contact between the bolt 92 and the ring member 62 will make some noise and alert the vehicle driver to have the tie rods 16 and 26 inspected.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A vehicle steering linkage for steering a steered vehicle wheel comprising:
   a first link;
   a second link;
   a primary connection between said first link and said second link including a ball fixed to one of said first and said second links and a socket that retains the ball and is fixed to the other one of said first and said second links;
   a redundant connection between said first link and said second link including a slot through said first link and a retainer that is attached to said second link that passes through the slot and that has a head on a free end of the retainer with a head width that prevents passage of the head through the slot and which prevents separation of said second link from said first link; and
   wherein steering forces pass through said primary connection prior to failure of the primary connection and pass through said redundant connection following failure of said primary connection.

2. A vehicle steering linkage as set forth in claim 1 wherein said second link is a steering knuckle and said first link is a tie rod.

3. A vehicle steering linkage as set forth in claim 2 wherein the tie rod has an inner end that is connected to a rack of a rack and pinion steering system.

4. A vehicle steering linkage as set forth in claim 1 wherein said steered vehicle wheel is a rear wheel of a four wheel steering system.

5. A vehicle steering linkage as set forth in claim 1 wherein the ball of said primary connection is fixed to a steering knuckle and the socket that retains the ball is fixed to a tie rod.

6. A vehicle steering linkage comprising:
   a tie rod end bracket mounted on an outer end of a tie rod and having a socket;
   a ball retained in the socket in the tie rod end bracket and wherein the ball is rotatable relative to the tie rod end bracket;
   a shank connected to the ball and attached to a steering arm to form a primary ball and socket connection between said tie rod and said steering arm;
   a slot in the tie rod end bracket;
   a pin passing through the slot and having a fixed end attached to said steering arm and a free end with a head that prevents passage through the slot; and
   wherein the pin and slot form a redundant connection that transmits steering forces from said tie rod to said steering arm and prevents separation of the second link from the first link after failure of the primary ball and socket connection.

7. A vehicle steering linkage as set forth in claim 6 wherein the pin passing through the slot is a threaded fastener that screws into a threaded bore in said steering arm.

8. A vehicle steering linkage as set forth in claim 7 wherein said steering arm is a steering knuckle.

9. A vehicle steering linkage as set forth in claim 8 wherein the head that prevents passage through the slot is a bolt head.

10. A vehicle steering linkage as set forth in claim 6 wherein said tie rod has an inner end that is attached to a rack of a rack and pinion steering system.

11. A vehicle steering linkage as set forth in claim 6 wherein said steering arm steers a rear wheel of a vehicle.

12. A method of steering a vehicle having an outer tie rod end connected to a steering arm by a primary connector and by a secondary connector comprising:
   transmitting steering forces from the outer tie rod end to the steering arm through the primary connector only prior to failure of said primary connector; and
   transmitting steering forces from the outer tie rod end to the steering arm through said secondary connector following failure of said primary connector.

13. A vehicle steering linkage comprising:
   a tie rod end bracket mounted on an outer end of a tie rod and having a socket;
   a ball retained in the socket in the tie rod end bracket and wherein the ball is rotatable relative to the tie rod end bracket;

a shank connected to the ball and attached to a steering arm to form a primary ball and socket connection between said tie rod and said steering arm;

a slot in the tie rod end bracket;

a pin passing through the slot and having a fixed end attached to said steering arm and a free end with a head that prevents passage through the slot and wherein the pin passing through the slot is a threaded fastener that screws into a threaded bore in said steering arm; and wherein the pin and slot form a redundant connection that transmits steering forces from said tie rod to said steering arm after failure of the primary ball and socket connection.

14. A vehicle steering linkage as set forth in claim 13 wherein said steering arm is a steering knuckle.

15. A vehicle steering linkage as set forth in claim 14 wherein the head that prevents passage through the slot is a bolt head.

16. A vehicle steering linkage as set forth in claim 13 wherein said tie rod has an inner end that is attached to a rack of a rack and pinion steering system.

17. A vehicle steering linkage as set forth in claim 13 wherein said steering arm steers a rear wheel of a vehicle.

* * * * *